United States Patent
Ishikawa et al.

(10) Patent No.: US 10,048,492 B2
(45) Date of Patent: Aug. 14, 2018

(54) SCANNING OPTICAL SYSTEM AND RADAR

(71) Applicant: KONICA MINOLTA, INC., Chiyoda-ku (JP)

(72) Inventors: Ryouta Ishikawa, Chiyoda-ku (JP); Shoji Kogo, Chiyoda-ku (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/517,807

(22) PCT Filed: Oct. 6, 2015

(86) PCT No.: PCT/JP2015/078319
§ 371 (c)(1),
(2) Date: Apr. 7, 2017

(87) PCT Pub. No.: WO2016/056541
PCT Pub. Date: Apr. 14, 2016

(65) Prior Publication Data
US 2017/0307874 A1    Oct. 26, 2017

(30) Foreign Application Priority Data
Oct. 7, 2014    (JP) .................................. 2014-206097

(51) Int. Cl.
*G02B 26/08* (2006.01)
*G02B 26/10* (2006.01)
(Continued)

(52) U.S. Cl.
CPC .............. *G02B 26/10* (2013.01); *G01S 7/481* (2013.01); *G01S 17/10* (2013.01); *G01S 17/88* (2013.01); *G02B 26/12* (2013.01); *H04N 1/113* (2013.01)

(58) Field of Classification Search
CPC ...... G02B 26/10; G02B 26/12; G02B 26/121; G02B 26/123; G02B 5/09; G02B 26/0816;
(Continued)

(56) References Cited

U.S. PATENT DOCUMENTS 5,000,529 A * 3/1991 Katoh ...................... G02B 5/09
                                                              235/462.39
5,028,103 A    7/1991 Fukasawa et al.
6,107,622 A * 8/2000 Yao ..................... G02B 26/0816
                                                                  250/235

FOREIGN PATENT DOCUMENTS

DE    202005005448    7/2005
JP    50-109737       8/1975
(Continued)

OTHER PUBLICATIONS

Search Report dated Mar. 7, 2018 which issued in the corresponding European Patent Application No. 15849016.9.

*Primary Examiner* — Euncha Cherry
(74) *Attorney, Agent, or Firm* — Cozen O'Connor

(57) ABSTRACT

A scanning optical system, includes a mirror unit equipped with a first mirror surface and a second mirror surface each of which inclines to a rotation axis; and a light projecting system which includes at least one light source to emit a light flux toward the first mirror surface. A light flux emitted from the light source is reflected on the first mirror surface of the mirror unit, thereafter, reflected on the second mirror surface, and then, projected so as to scan in a main scanning direction onto an object in accordance with rotation of the mirror unit, and the light flux reflected on the second mirror surface is polarized in a range within an angle of ±30 degrees to a direction perpendicular to the main scanning direction on the object side.

9 Claims, 13 Drawing Sheets

(51) Int. Cl.
  *G01S 7/481*   (2006.01)
  *G02B 26/12*   (2006.01)
  *H04N 1/113*   (2006.01)
  *G01S 17/10*   (2006.01)
  *G01S 17/88*   (2006.01)

(58) Field of Classification Search
  CPC .......... G01S 7/481; G01S 17/10; G01S 17/88;
                      G01S 17/93; H04N 1/113
  USPC ...................................................... 359/201.1
  See application file for complete search history.

(56) References Cited

FOREIGN PATENT DOCUMENTS

| | | |
|---|---|---|
| JP | 154248/1977 | 11/1977 |
| JP | 01-315716 | 12/1989 |
| JP | 2014-071028 | 4/2014 |
| WO | WO 2005/098509 | 10/2005 |

\* cited by examiner (a)

(b)

SCANNING OPTICAL SYSTEM AND RADAR

RELATED APPLICATIONS

This is a U.S. National Phase Application under 35 USC 371 of International Application PCT/JP2015/078319 filed on Oct. 6, 2015.

This application claims the priority of Japanese application no. 2014-206097 filed Oct. 7, 2014, the entire content of which is hereby incorporated by reference.

TECHNICAL FIELD

The present invention relates to a scanning optical system suitably used for a radar which irradiates a laser beam and the like so as to detect an object, and to a radar.

BACKGROUND ART

In recent years, in the fields, such as vehicles, security robots, unmanned helicopters, and the like, requests to perform obstacle detection in a proceeding direction accurately for the purpose of collision prevention, have been increasing. As methods of detecting obstacles, a laser radar which is a distance measuring apparatus utilizing optical scanning, has been known. General laser radars are configured to rotate or oscillate a polygon mirror or the like while projecting light fluxes emitted from a laser light source onto a mirror, the polygon mirror, or the like so as to scan a wide range and to receive scattered light rays from a projected object with a light receiving element, thereby performing distance measurement.

PTL 1 discloses a technique with regard to a polygon mirror which includes the even number of planar reflective surfaces and performs scanning by reflecting light rays the even number of times.

CITATION LIST

Patent Literature

PTL 1: JP S50-109737

SUMMARY OF INVENTION

Technical Problem

By the way, if an object (measurement object, or object to be measured) being a target of distance measurement has light absorbing properties or regularly reflecting properties, in the case where reflected light rays from the measurement object among light fluxes emitted from the radar, are weak or do not return, the intensity of light rays entering a light receiving element becomes weak. As a result, detection may become difficult, and there is a fear that distance measurement may become impossible. That is, in the radar, it can be said that, as the intensity of scattered light rays per unit projected light intensity from a measurement object in the direction to a light receiving element becomes higher, distance measurement becomes easier. In order to make unit projected light intensity high, for example, laser light fluxes may be used. However, in the case of projecting such laser light fluxes, if a pond or a marsh is included in a scanning range, the intensity of reflected light rays from the measurement object becomes weak. As a result, it has become clear that sufficient distance information may not be acquired. However, PTL 1 does not disclose a technique for solving these problems.

The present invention has been achieved in view of the above-mentioned circumstances, and an object of the present invention is to provide a scanning optical system capable of acquiring reflected light rays with sufficient intensity regardless of measurement objects and a radar.

Solution to Problem

In order to realize at least one of the object mentioned above, a scanning optical system reflecting one aspect of the present invention, includes:

a mirror unit equipped with a first mirror surface and a second mirror surface each of which inclines to a rotation axis; and a light projecting system including at least one light source to emit a light flux toward the first mirror surface, wherein a light flux emitted from the light source is reflected on the first mirror surface of the mirror unit, thereafter, reflected on the second mirror surface, and then, projected so as to scan in a main scanning direction onto an object in accordance with rotation of the mirror unit, and wherein the light flux reflected on the second mirror surface is polarized on an object side in a range within an angle of ±30 degrees to a direction perpendicular to the main scanning direction.

According to this scanning optical system, since a light flux emitted from the light source is reflected twice on the first mirror surface and on the second mirror surface, it becomes possible to project a light flux uniformly in which a change in a polarization direction and in a rotation angle of a cross sectional shape (a beam profile) orthogonal to a proceeding direction is not likely to occur in a scanning range. With this, a light flux emitted from the light projecting system does not rotate substantially at the time of being projected to an object side in contrast to a later-mentioned system shown in FIG. 6. Accordingly, it becomes possible to receive scattered light rays with sufficient intensity, for example, even from an object in the water existing in a pond, a marsh, or a puddle, whereby it is possible to provide a scanning optical system used for a radar which performs distance measurement easily regardless of objects.

Advantageous Effects of Invention

According to the present invention, it becomes possible to provide a scanning optical system which can acquire reflected light rays with sufficient intensity regardless of objects, and a radar.

DESCRIPTION OF EMBODIMENTS

Distance measurement (range finding) with TOF (Time of flight) can be performed by using LED or laser, which performs pulse light emission, as a light source of a radar. As compared with conventional scanning optical systems which have been used for radars configured to use TOF, since a change of resolving power is fewer in a wide main scanning angle, it is possible to provide a radar with a wide viewing angle usable effectively.

Figure 1:
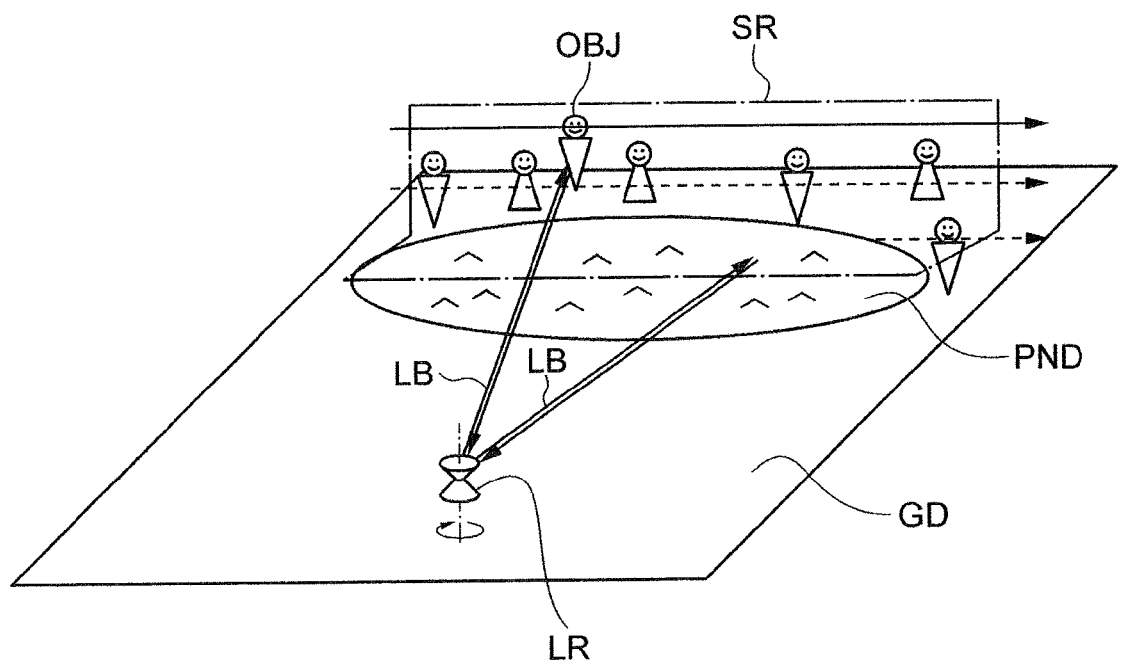
FIG. 1 is an illustration showing a state where a laser light flux is projected from a laser radar so as to scan a scanning surface including a pond or a marsh PND.

Hereinafter, the present embodiment will be described with reference to the attached drawings. First, in the case where a pond, a marsh, or puddles is included in the scanning range of a laser radar, conditions under which it is difficult for reflected light rays to return, are described. It is generally known that light is an electromagnetic wave, and is a transverse wave in which an electromagnetic field vibrates vertically to a proceeding direction, and its reflection, transmission, and scattering characteristics change depending on its polarization direction. For example, with reference to FIG. 1, consideration is given to a case where a laser light LB is projected from a laser radar LR in a range between a predetermined upward angle and a predetermined downward angle with respect to a direction horizontal to a ground surface GD so as to make a rectangle range indicated with a one-dot chain line to an object range (subject range) SR (a main scanning direction is made from the left to the right).

Figure 2:
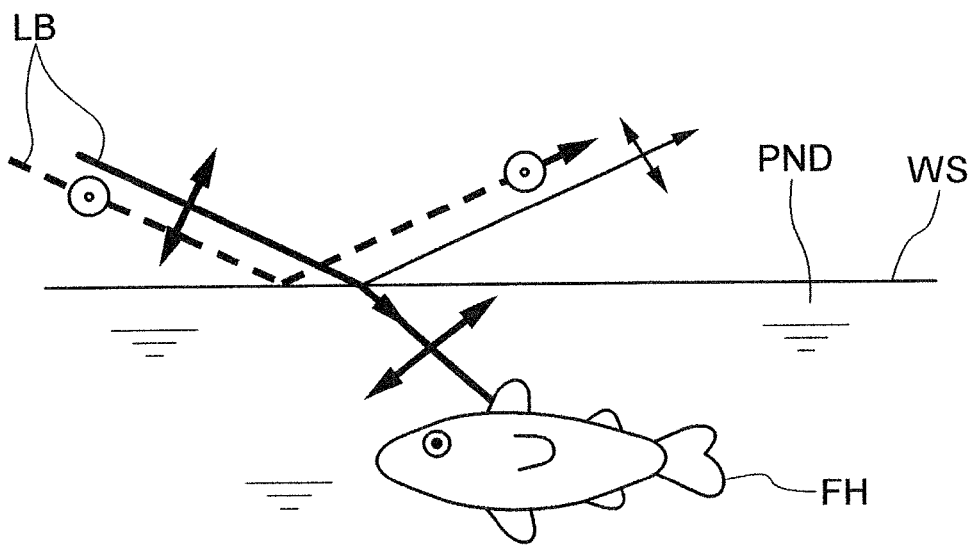
FIG. 2 is a cross sectional view which shows a state where a laser light flux enters and is reflected on a pond or a marsh PND, and shows a polarization direction provided to a laser light flux with an arrowed direction.

Herein, when a laser light flux LB is irradiated to an object OBJ existing on a ground, its reflected light rays return to the laser radar LR, whereby distance measurement can be performed. However, in the case where a pond or a marsh PND exist within a scanning surface, an amount of the reflected light rays changes in accordance with the polarization direction of the laser light flux LB. In concrete terms, in a comparison between a case where the polarization direction of a laser light flux LB at the time of entering a pond or a marsh PND is an approximately vertical direction to a main scanning direction (a solid line shown in FIG. 2) and a case where the polarization direction is approximately parallel to a main scanning direction (a dotted line shown in FIG. 2), an amount of light regularly reflected on a water surface WS in the former case is smaller than that in the latter case, and an amount of light entering in the water increases. Accordingly, the intensity of scattered lights from an object FH in the water (there may be a case where an object FH is a bottom surface) becomes high. Namely, in the case where light is projected to a pond or a marsh PND the surface of which is almost flat, if a polarization direction is an approximately vertical direction to a main scanning direction, unit projection light intensity of scattered light rays returning to the laser radar LR direction becomes high, whereby distance measurement becomes easy. On the other hand, in the case where the polarization direction is approximately parallel to the main scanning direction, an amount of light rays regularly reflected on a water surface WS increases, and an amount of light entering in the water decreases. Accordingly, the intensity of scattered light rays from an object FH in the water becomes low, whereby distance measurement becomes difficult.

Figure 3:
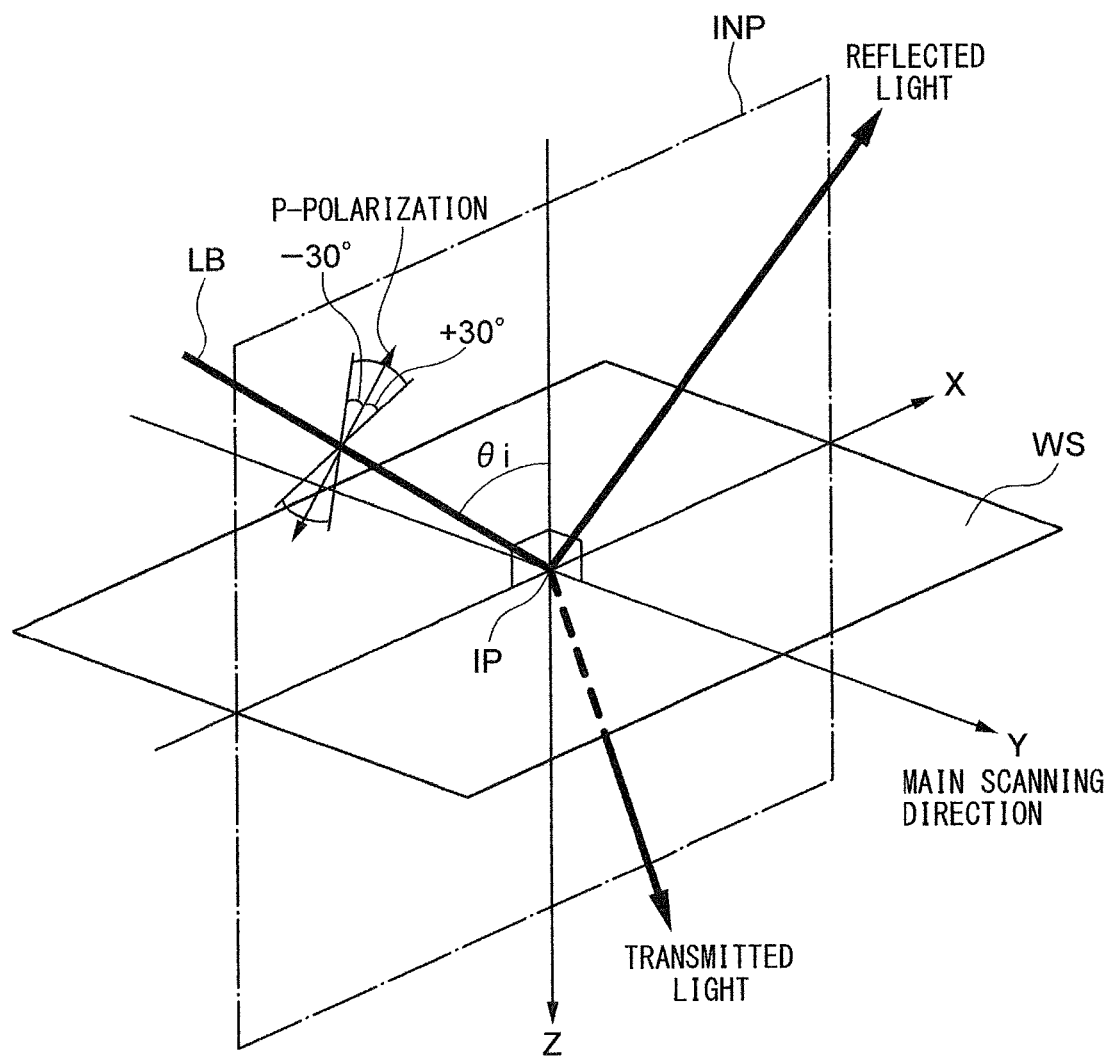
FIG. 3 is an illustration showing a state where a laser light flux LB has entered a water surface WS, such as a pond or a marsh.

Next, description is given to a reason why an amount of regularly reflected light rays becomes small in accordance with a polarization direction when a laser light flux LB enters the water surface WS of a pond or a marsh PND. FIG. 3 is a diagram showing a state where a laser light flux LB has entered the water surface WS of a pond or a marsh, it is assumed that an incident point is IP, a normal line direction on the water surface WS at the incident point IP is set to a Z direction, and a plane formed by the laser light flux LB and the Z direction is set to an incident plane INP. Furthermore, an intersection line between the water surface WS and the incident plane INP is set to an X direction, and a main scanning direction which passes the incident point IP is set to a Y direction. The X direction and the Y direction are not necessarily required to be orthogonal to each other, but, the Y direction and the Z direction are orthogonal to each other.

Herein, the laser light flux LB proceeds along the incident plane INP. An intersection angle between the laser light flux LB and the Z direction is set to an incident angle •i. The case where a light flux has a polarization direction along the incident plane INP, is p-polarization, and the case where a light flux has a polarization direction orthogonal to the incident plane INP, is s-polarization.

Figure 4:
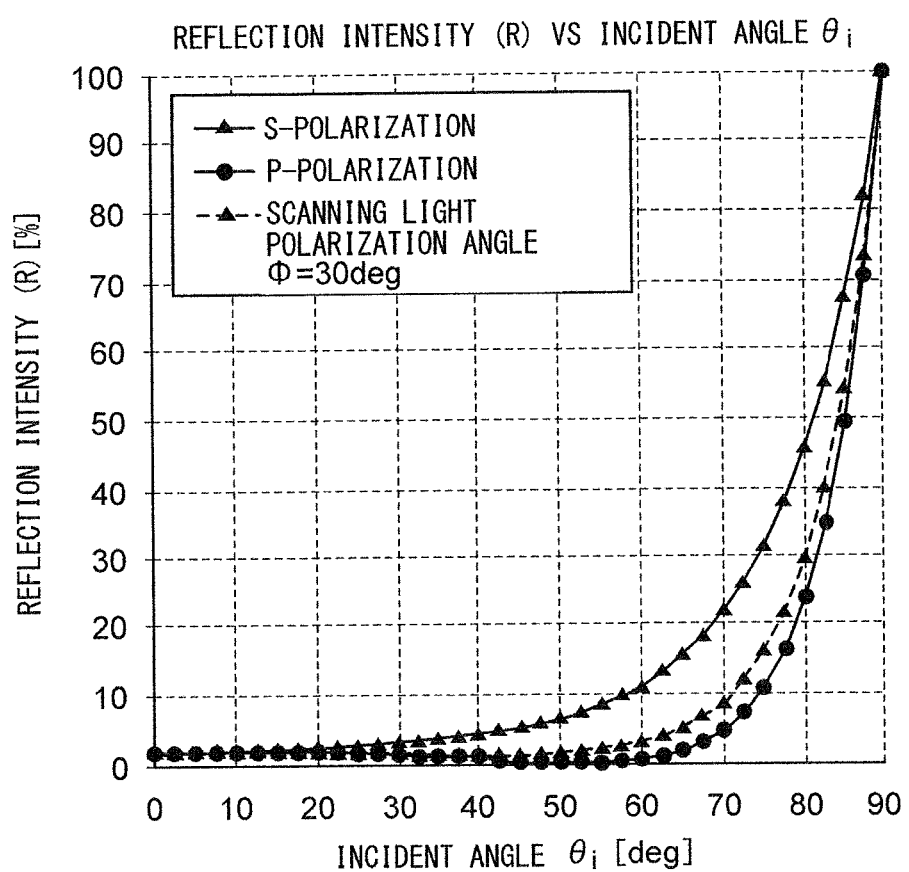
FIG. 4 is a graph showing a relationship with a transverse axis which indicates an incident angle θi of a laser light flux LB, used for scanning, onto a boundary surface (for example, a water surface), and a longitudinal axis which indicates reflection intensity (a ratio to the intensity of an entering light) R on the boundary surface.

FIG. 4 is a graph showing a relationship with a transverse axis which indicates an incident angle •i of a laser light flux LB, used for scanning, onto a boundary surface (for example, a water surface), and a longitudinal axis which indicates reflection intensity (a ratio to the intensity of an entering light flux) R on the boundary surface. Here, an example is shown, in which a laser light flux LB proceeds from air (a refractive index=1) into water (a refractive index=1.33). The reflection intensity R means a ratio of a light flux reflected on the incident point IP to a laser light flux LB which has entered a water surface WS. A case where R is 0% shows a full transmission state, and a case where R is 100% shows a total reflection state. For example, in the case where an incident angle •i is 70°, when a direction is vertical (p-polarization) to the main scanning direction, the reflection intensity R is 5%. On the other hand, when a direction is parallel (s-polarization) to the main scanning direction, the reflection intensity R is 22% which is four times the former.

As is clear from FIG. 4, in the case of s-polarization except a case where •i is 0°, the reflection intensity R becomes higher on the entire area than that of p-polarization. Namely, at the time of entering the water surface WS, when the laser light flux LB is p-polarization, an amount of light having passed through the water surface WS after having entered the water surface WS, increases, whereby a probability that the laser light flux LB is reflected on an object existing in the water, becomes high, and an amount of light returning to the laser radar also increases.

Note that at the time of entering the water surface WS, the laser light flux LB is not necessarily required to be perfect p-polarization. Here, in FIG. 4, consideration is given to reflection intensity R in the case where a laser light flux LB with polarization of a polarization angle • inclining at ±30 degrees to the polarization direction (p-polarization) along the incident plane INP shown in FIG. 3 is made to enter the water surface WS. In the case where the incident angle •i is 70 degrees, if the polarization angle • is ±30 degrees, the reflection intensity R becomes about 9% which is half or less of that of the s-polarization, whereby an effect near to that of the p-polarization can be obtained. However, it may be said that, if the polarization angle • is made more than that, since an amount of light having passed into the water becomes insufficient due to an increase of the reflection intensity R, scattered lights returning from an object in the water to the laser radar decreases, whereby distance measurement becomes difficult. From the above, in the case where the polarization direction of the laser light flux LB is, on a measurement object side, a linearly polarized light flux with a polarization direction within ±30 degrees to a direction perpendicular to the main scanning direction, it is said that an amount of light retuning to the laser radar can be secured sufficiently. Here, a "linearly polarized light" in the present specification means a light flux which satisfies a conditional formula of $I'/I_0<0.2$ in the case where, in a system which measures the intensity of a light flux after the light flux has passed a polarizer to allow a light flux to pass in a specific polarization direction, the intensity of a light flux in a polarization direction determined by rotating the polarizer so as to become the largest intensity is made to I0, and the intensity of the light flux in the polarization direction orthogonal to it is made to I'. Furthermore, the polarization direction of the intensity $I_0$ is called a linear polarization direction.

Figure 5:
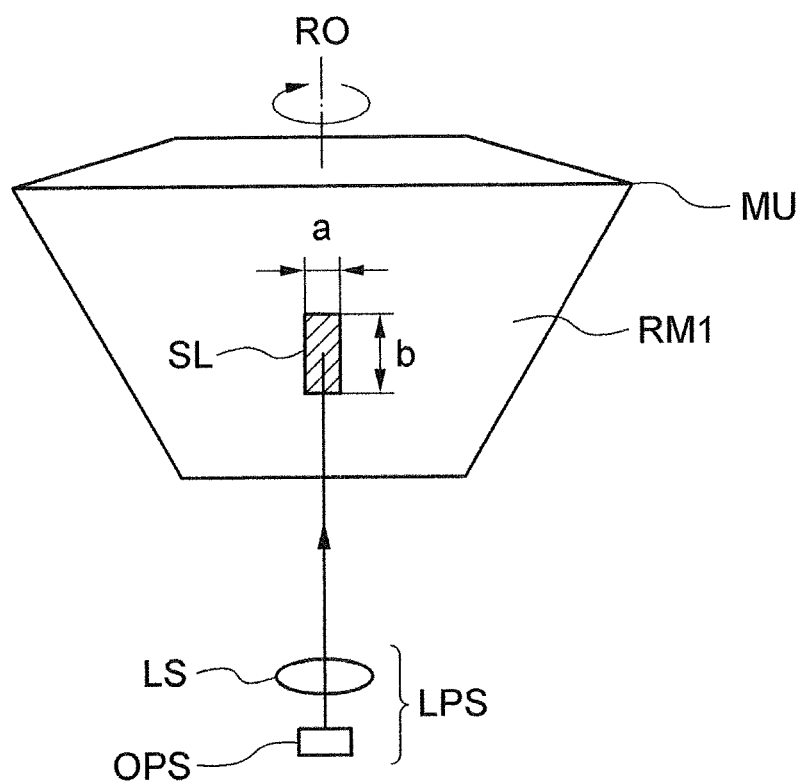
FIG. 5 is a schematic diagram showing a scanning optical system of a comparative example, and is a view seen from a front face.
Figure 6:
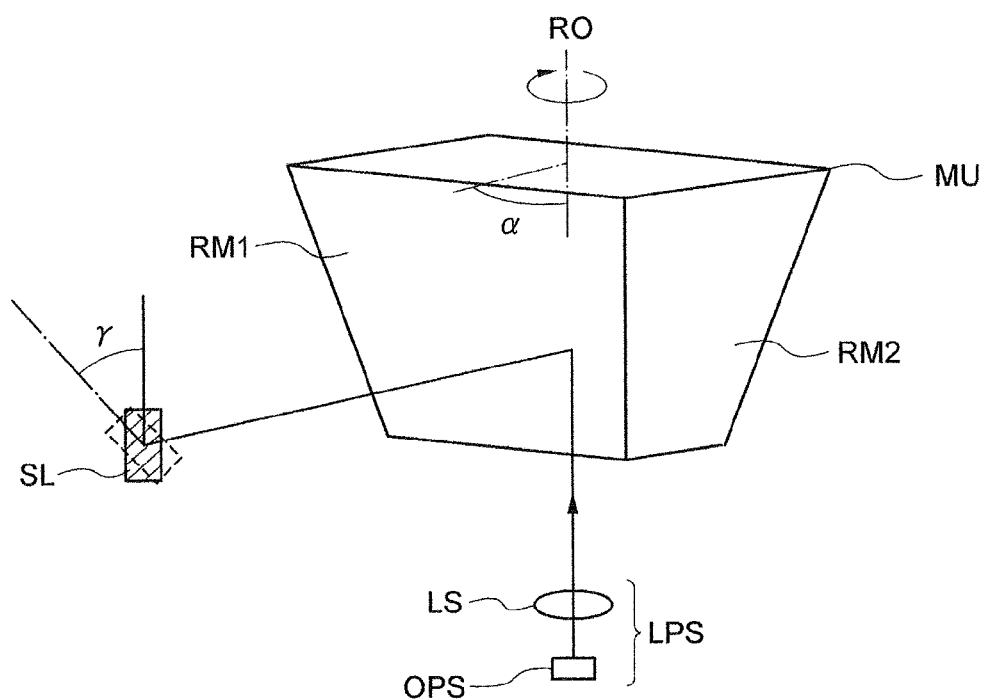
FIG. 6 is a schematic diagram which shows a scanning optical system of a comparative example, and shows a state where the scanning optical system rotates.

Incidentally, FIGS. 5 and 6 show a scanning optical system of a comparative example. In the case of using the comparative scanning optical system in which a laser light flux (hereinafter, referred to as a spot light) emitted from a light projecting system LPS is reflected only one time, and then, proceeds to a measurement object, there are problems described below. In FIG. 5, a mirror unit MU which includes a reflective surface RM1 inclining to a rotation axis RO is rotated around the rotation axis RO. A spot light SL emitted from a light source LD of a light projecting system LPS toward the reflective surface RM1 has a ratio between a transverse size and a longitudinal size different from each other. Therefore, in FIG. 5, a spot light SL which is reflected on the reflective surface RM1 and proceeds toward an object, proceeds in a direction vertical to a sheet surface and has a cross section (indicated with hatching) orthogonal to its proceeding direction which is a rectangular cross section with a length "a" in a main scanning angle direction (a horizontal direction in the figure) and a length "b" (>"a") in a sub-scanning angle direction (a vertical direction in the figure). Herein, consideration is given to a light flux with a polarization direction in a direction of the length "b".

Figure 7:
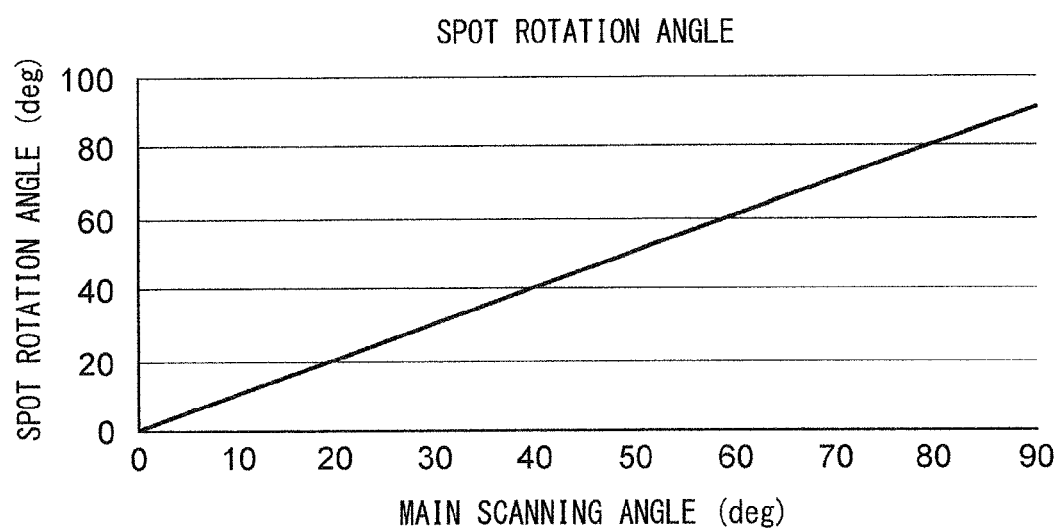
FIG. 7 shows a graph showing a relationship between a main scanning angle and a spot rotation angle in a scanning optical system of a comparative example.

In the case where the mirror unit MU shown in FIG. 5 is rotated, the light flux LB reflected on the reflective surface RM1 proceeds in the horizontal direction as shown in FIG. 6. With this movement, the light flux LB scans a range where a measurement object exists. However, in the case where a scanning angle is large, the spot light SL itself rotates (spot rotation) on the object side, and the rotation occurs in a polarization direction. FIG. 7 shows a graph showing a relationship between a main scanning angle and a spot rotation angle in the case where a light flux is made to enter, in parallel to the rotation axis RO, the reflective surface RM1 inclining by 45 degrees to the rotation axis. Here, in the case where a light flux is made to enter the reflective surface RM in parallel to the rotation axis RO, the spot rotation angle becomes the same as the main scanning angle.

Figure 8:
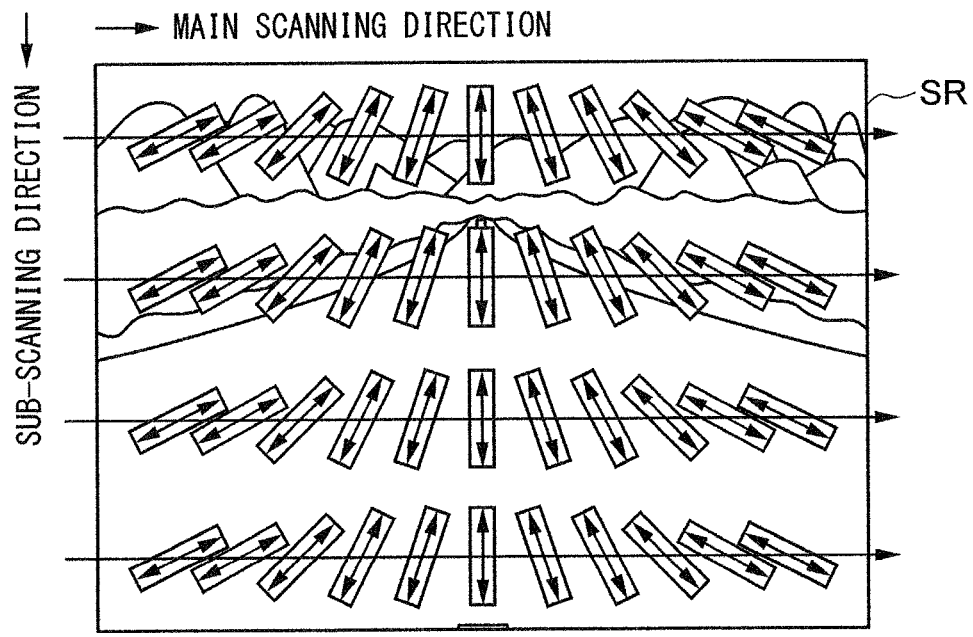
FIG. 8 is an illustration showing a situation where an inclination of a spot light projected to a measurement object from a scanning optical system of a comparative example changes depending on a position in a main scanning direction.

As shown in FIG. 7, as the rotation angle • of the reflective surface RM1 increases, the spot rotation angle • (that is, the rotation angle in the polarization direction) increases. FIG. 8 is an illustration which shows a situation where the inclination of a spot light projected to a measurement object from such a scanning optical system changes depending on a position in a main scanning direction, and shows an example where four different positions are scanned in parallel to the main scanning direction. As is clear from FIG. 8, a spot light SL at the center in the scanning range has a spot rotation angle • of 0 degree and stands vertically to the main scanning direction. On the other hand, a spot light SL at a periphery in the scanning range has an increased spot rotation angle •. That is, as the spot light SL proceeds closer to the periphery, an inclination becomes larger. With this, at the center in an object range SR, a range capable of being covered by the main scanning of one time is wide in the sub-scanning direction. On the other hand, at the both ends in the object range SR, a range capable of being covered by the main scanning of one time becomes narrow in the sub-scanning direction. Accordingly, there is a fear that omission of measurement for an object arises. In addition, in the case where the polarization direction of the spot light SL is made to a longer direction of a cross section of the spot light as shown with an arrow, the polarization direction of the spot light SL at the center of the scanning range is perpendicular (p-polarization) to the main scanning direction. On the other hand, the polarization direction of the spot light SL at the periphery of the scanning range becomes close to the main scanning direction, that is, becomes close to s-polarization. Accordingly, as shown in FIG. 4, at the time of entering a pond or a marsh, there is a fear that an amount of light returning to the laser radar decreases.

Figure 9:
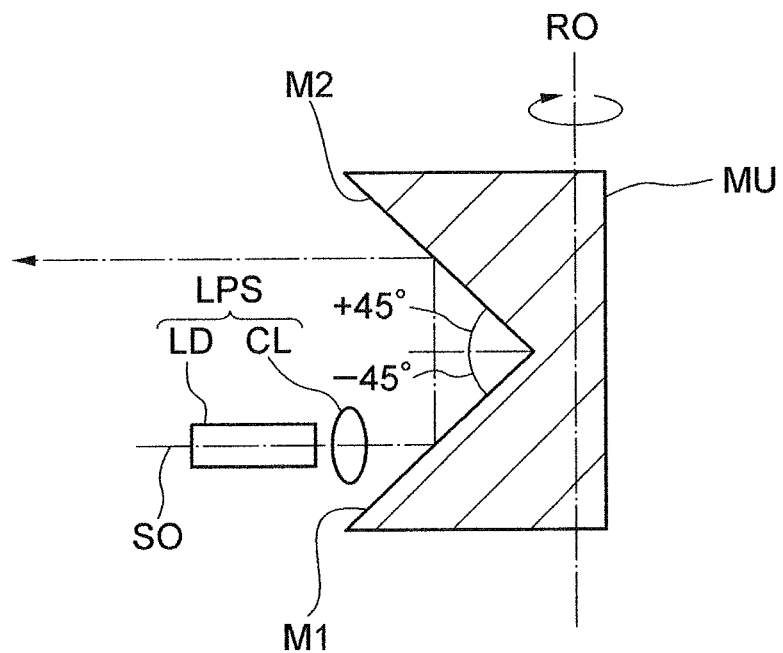
FIG. 9 is an illustration showing a scanning optical system according to the present embodiment by cutting it on a plane including a rotation axis.

Hereinafter, an embodiment of the present invention which solves the above problems will be described. FIG. 9 is a cross sectional view showing along a rotation axis RO a scanning optical system used for the laser radar LR of the present embodiment. FIG. 10(a) is a front view of the scanning optical system used for the laser radar LR of the present embodiment, and FIG. 10(b) is a view seeing in the direction of a rotation axis and showing a state of the center of the main scanning angle. FIG. 11(a) is a front view of a scanning optical system used for the laser radar LR of the present embodiment, and FIG. 11(b) is a view seeing in the direction of a rotation axis and showing a state of the periphery of the main scanning angle. Here, the scanning optical system is constituted by a mirror unit MU and a light projecting system LPS. A cross section of a spot light perpendicular to the proceeding direction, is similar to that in the comparative example.

As shown in FIG. 9, an optical axis SO of a light projecting system LPS including a light source LD and a collimator lens CL is disposed so as to be orthogonal to a rotation axis RO of a mirror unit MU including a first mirror surface M1 and a second mirror surface M2. At this time, the light projecting system LPS is disposed on the first mirror surface M1 side on the basis of the apex of an intersection angle formed by the first mirror surface M1 and the second mirror surface M2. Herein, the first mirror surface M1 is disposed so as to incline at an angle of −45 degrees from a flat surface orthogonal to the rotation axis RO with respect to an optical axis direction of the light projecting system LPS, and the second mirror surface M2 is disposed so as to incline at an angle of +45 degrees from a flat surface orthogonal to the rotation axis with respect to an optical axis direction of the light projecting system LPS.

Figure 10:
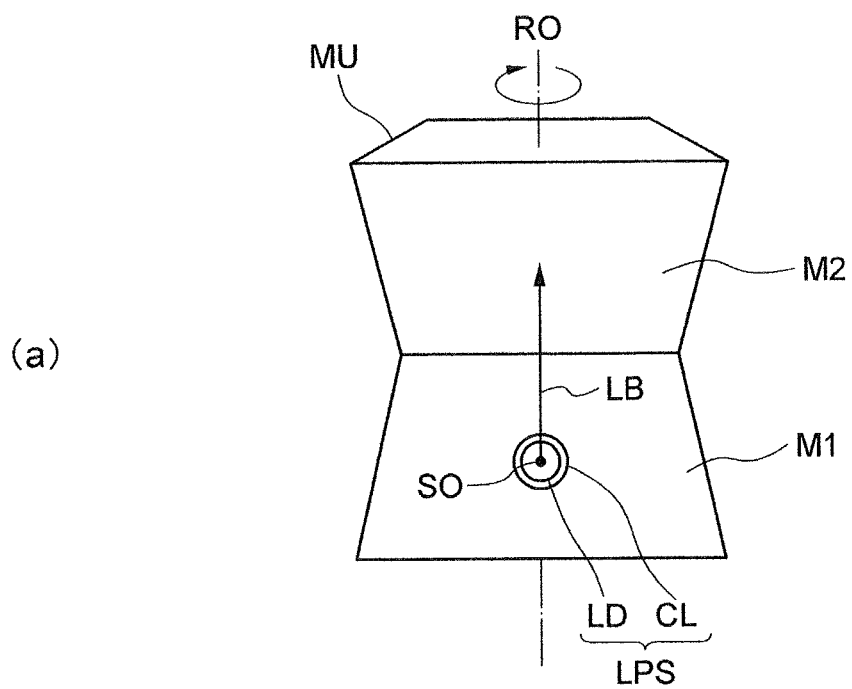
FIG. 10($a$) is a front view of a scanning optical system according to the present embodiment, and FIG. 10($b$) is a view seeing in the direction of a rotation axis and showing a state of the center of a main scanning angle.
Figure 10:
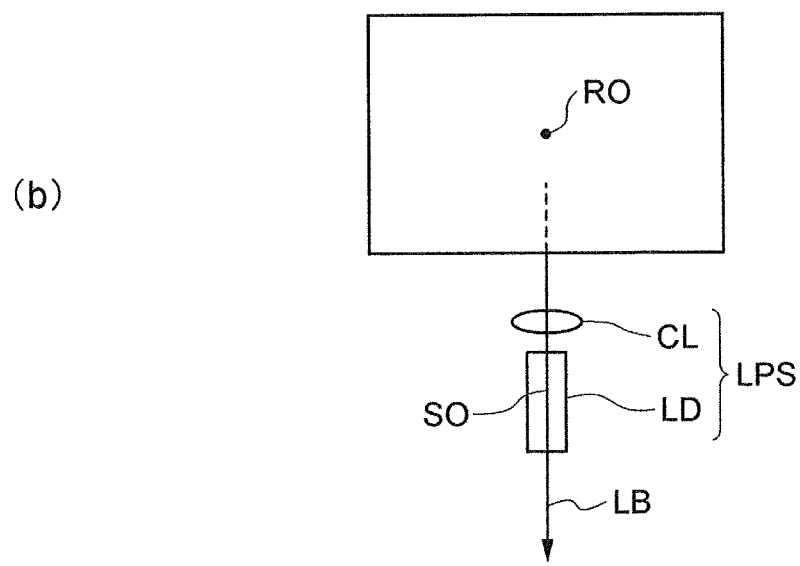

As shown in FIG. 10, when the rotating position of mirror unit MU becomes an angle at which the optical axis SO of the light projecting system LPS is located within a plane which includes the first mirror surface M1 and a normal line of the second mirror surface M2 (a state where the optical axis SO is oriented toward the center of the main scanning angle), the light flux LB emitted from the light projecting system LPS is reflected on the first mirror surface M1, proceeds in parallel to the rotation axis RO, and then, is reflected on the second mirror surface M2. Successively, the reflected light flux LB is projected from the second mirror surface M2 to an object. At this time, as shown in FIG. 10(a), when the mirror unit MU is seen from the light projecting direction, the optical axis SO of the light projecting system LPS may be displaced to the right or the left from the rotation axis RO.

Figure 11:
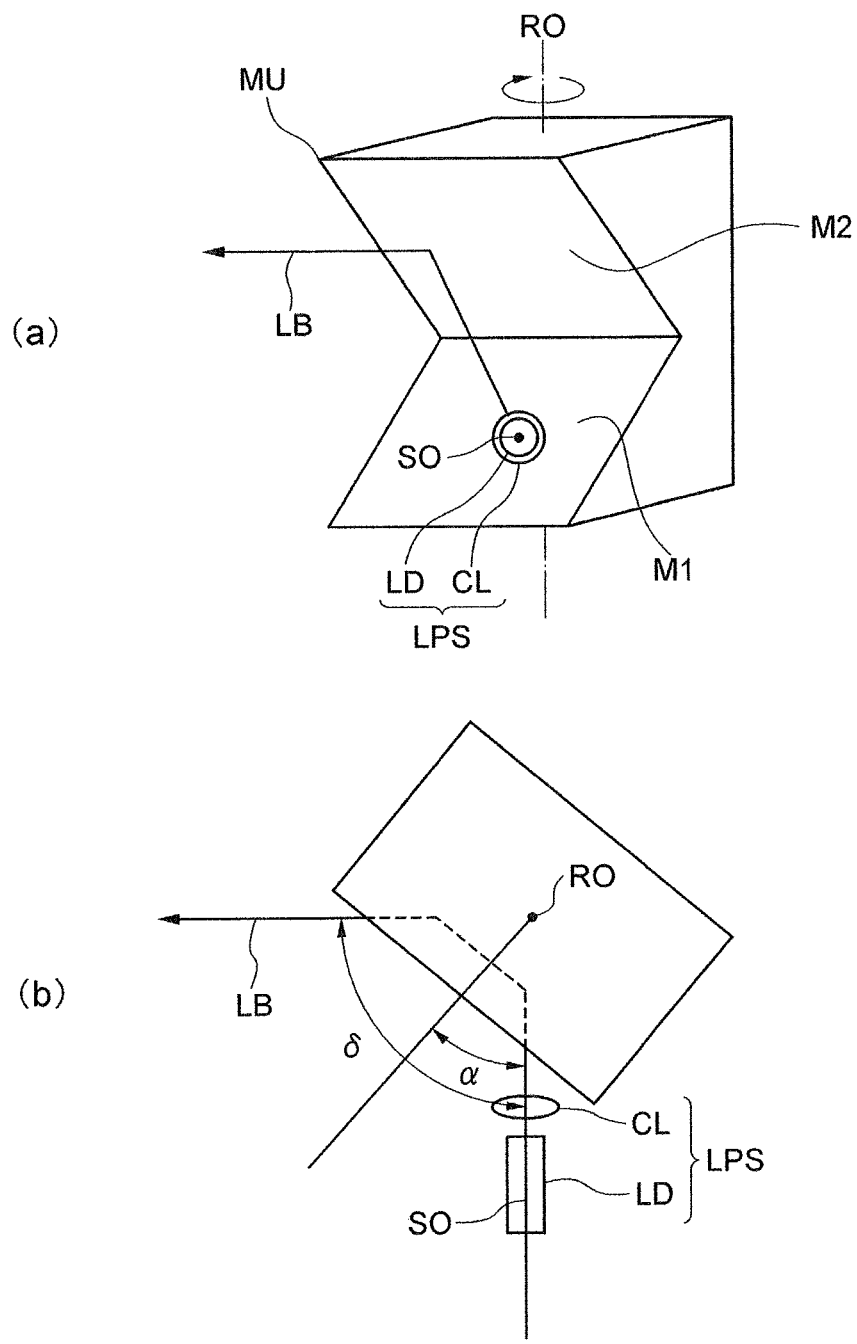
FIG. 11($a$) is a front view of a scanning optical system according to the present embodiment, and FIG. 11($b$) is a view seeing in the direction of a rotation axis and showing a state of the periphery of a main scanning angle.
Figure 12:
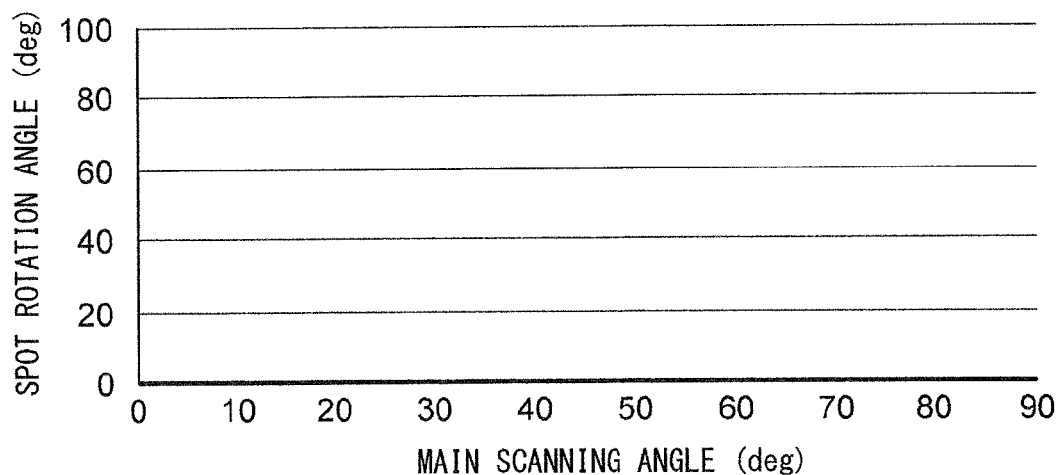
FIG. 12 is a graph showing a relationship between a main scanning angle and a spot rotation angle according to the present embodiment.

Furthermore, as shown in FIG. 11, in the case where the mirror unit MU is rotated only by a rotation angle • of 45 degrees from the center of the main scanning angle (a state shown in FIG. 10) around the rotation axis RO, a main scanning angle as a relative angle difference between a light flux LB after having been reflected on the second mirror surface M2 and a light flux LB immediately after having been emitted from the light projecting system (as shown in FIG. 11(b), when viewing from the rotation axis RO, an angle formed by the optical axis SO of the light projecting system LPS and a light flux LB emitted from the mirror unit MU), becomes 90 degrees. Namely, it turns out that the main scanning angle (•=90 degrees) being two times the rotation angle (•=45 degrees) has been obtained. A relationship of a spot rotation angle, that is, a rotation angle in the polarization direction, relative to the main scanning angle • is shown in FIG. 12. As is clear from FIG. 12, in this way, in the case where an angle formed by the first mirror surface M1 and the second mirror surface M2 is 90 degrees, even if the main scanning angle • changes, the spot rotation angle •, i.e., a rotation angle in a polarization direction, does not change. Therefore, a spot light with a vertically long cross section is projected to an object, whereby it becomes possible to scan ideally. Namely, it is shown that a spot rotation can be suppressed by reflecting a spot light two times on the first mirror surface M1 and the second mirror surface M2. Such a mirror unit MU makes it possible to realize a scanning optical system capable of projecting a light flux so as to scan without causing spot rotation on the entire region of a main scanning angle, i.e., without changing the polarization direction, and a laser radar equipped with the scanning optical system.

Figure 13:
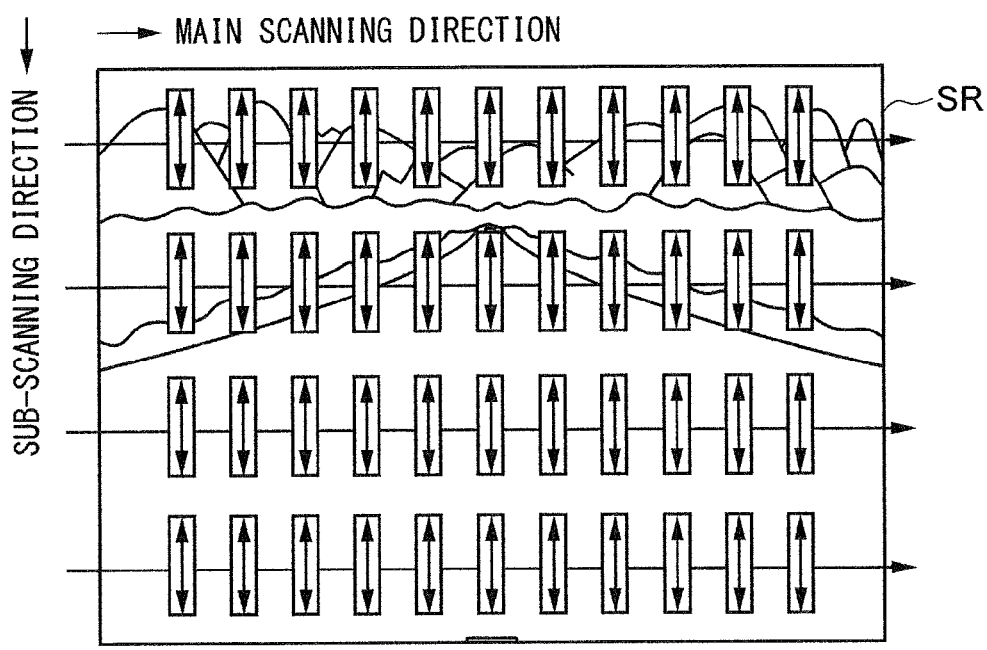
FIG. 13 is an illustration showing a situation where an inclination of a spot light projected to a measurement object from a scanning optical system according to the present embodiment does not change depending on a position in a main scanning direction.

FIG. 13 is an illustration showing a situation where an inclination of a spot light projected to a measurement object from the scanning optical system according to the present embodiment does not change depending on a position in a main scanning direction, and shows an example which includes four sub-scanning directions. Herein, for easy comprehension, spot lights SL arranged side by side in the sub-scanning direction are made not to come in contact with each other. However, it is preferable that spot lights SL are made so as to actually come in contact with each other or to superimpose on each other. With this, the measurement can be performed without omission in the sub-scanning direction. As is clear from FIG. 13, the spot light SL almost does not rotate over the entire region on the range of an object in contrast to the system shown in FIG. 6. Accordingly, its polarization direction becomes constant (in a longer direction as shown with an arrow, that is, in a right angle to the main scanning direction) without depending on the main scanning angle. For this reason, when a spot light SL proceeding toward any of the range of an object enters a pond or a marsh, it becomes possible to secure a sufficient amount of light returning to the laser radar.

Figure 14:
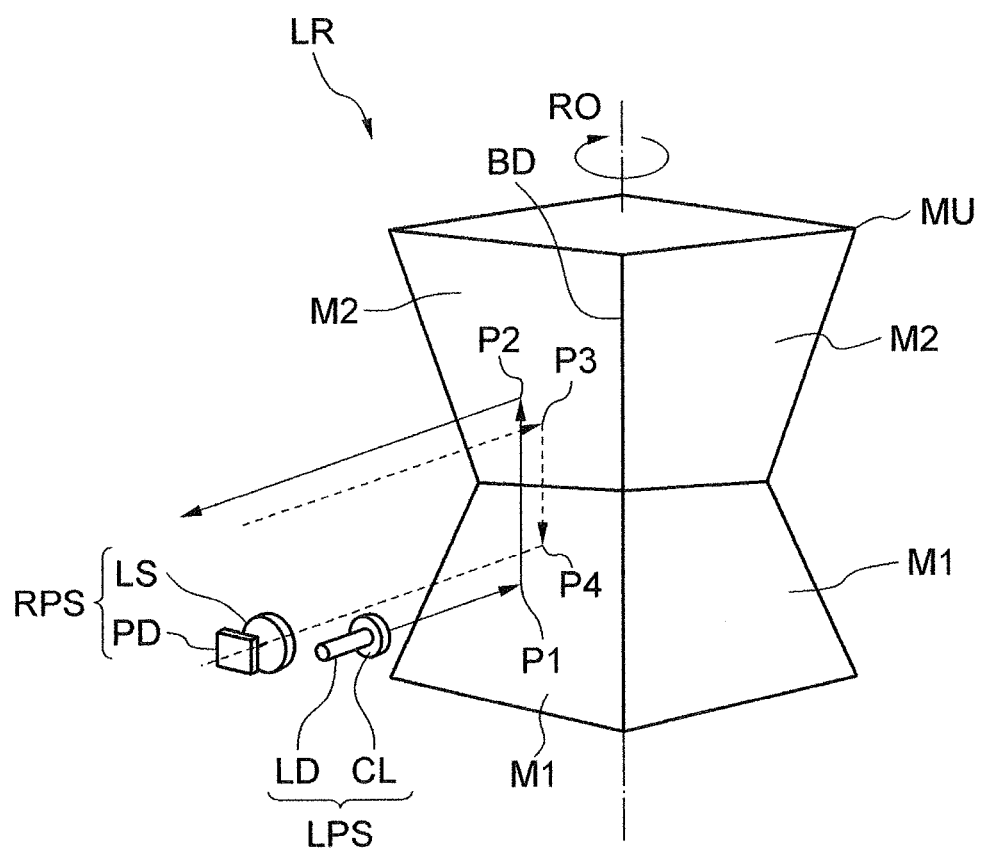
FIG. 14 is a schematic constitutional diagram of a laser radar LR according to the present embodiment.

FIG. 14 is a perspective view showing a main constitution of a laser radar LR according to the present embodiment, in which a shape, length, etc. of each of the main constitutional elements may differ from the actual shape, length, etc. The laser radar LR includes, for example, a semiconductor laser LD as a light source, a collimator lens CL which converts diverging light beams from the semiconductor laser LD into parallel light beams, a mirror unit MU which projects scanning laser beams made to parallel by the collimator lens CL toward an object OBJ side (FIG. 1) with a rotating reflective surface and reflects the reflected light flux from the object projected with the scanning laser beams, a lens LS which collects the reflected light flux reflected on the mirror unit MU from the object, and a photo diode PD which receives the light flux collected by the lens LS.

The semiconductor laser LD and the collimator lens CL constitute the light projecting system LPS, and the lens LS and the photo diode PD constitute the light receiving system RPS. The light flux emitted from the light projecting system LPS becomes longer in the sub-scanning direction than in the main scanning direction on the scanning surface (refer to FIG. 5).

The approximately square tube-shaped mirror unit MU is made of resin, and is held so as to be rotatable around the rotation axis RO being an axis line. On its lower outer periphery, four trapezoid-shaped first mirror surfaces M1 are disposed, and so as to oppose them, on its upper outer periphery, four trapezoid-shaped second mirror surfaces M2 are disposed. An intersection angle between the first mirror surface M1 and the second mirror M paired vertically as a pair is different from the respective intersection angles of the other pairs. As one example, each of the first mirror surfaces M1 inclines by an angle of 45 degrees to an orthogonal surface to the rotation axis Ro, and the second mirror surfaces M2 incline toward the opposite sides by the respective angles of 60 degrees, 55 degrees, 50 degrees, and 45 degrees. Each of the first mirror surface M1 and the second mirror surface M2 is covered with a reflective film by depositing, coating, or planting, or a metal polishing mirror or a film mirror by pasting.

The optical axis of each of the light projecting system LPS and the light receiving system RPS is made to be orthogonal to the rotation axis RO of the mirror unit MU, and the light projecting system LPS is disposed farther in the direction of the rotation axis RO than the light receiving system RPS.

Next, a distance measurement operation of the laser radar LR is described. The diverging light flux intermittently emitted in a pulse shape from the semiconductor laser LD is converted into a parallel light flux by the collimator lens CL. Then, the parallel light flux is made to enter a point P1 on the first mirror surface M1 of the rotating mirror unit MU, is reflected on there, further reflected on a point P2 on the second mirror surface M2, and is projected so as to scan toward the object OBJ side.

The four combinations of the first mirror surface M1 and the second mirror surface M2 in the mirror unit MU have the respective four different kinds of intersection angles. Accordingly, when the mirror unit MU rotates once, it becomes possible to scan four different sub-scanning directions on the object side. With reference to FIG. 13, a laser light flux is reflected sequentially on the first mirror surface M1 and the second mirror surface M2 which are rotating and moving. First, a laser light flux reflected on the first pair of the first mirror surface M1 and the second mirror surface M2 is made to scan horizontally from the left to the right on the uppermost region on the scanning surface in response to the rotation of the mirror unit MU. Next, a laser light flux reflected on the second pair of the first mirror surface M1 and the second mirror surface M2 is made to scan horizontally from the left to the right on the second region from the top of the scanning surface in response to the rotation of the mirror unit MU. Hereafter, the scanning is repeated similarly, whereby the object can be scanned two dimensionally.

Among the light fluxes projected for scanning, laser light rays which hit on an object OBJ and are reflected on it, enter again the second mirror surface M2 (P3) of mirror unit MU as shown with a dotted line in FIG. 14, are reflected on there, further reflected on the first mirror surface M1 (P4), collected by the lens LS, and detected by the light receiving surface of the photo diode PD, respectively. With this, the object OBJ on the object range can be detected.

Figure 15:
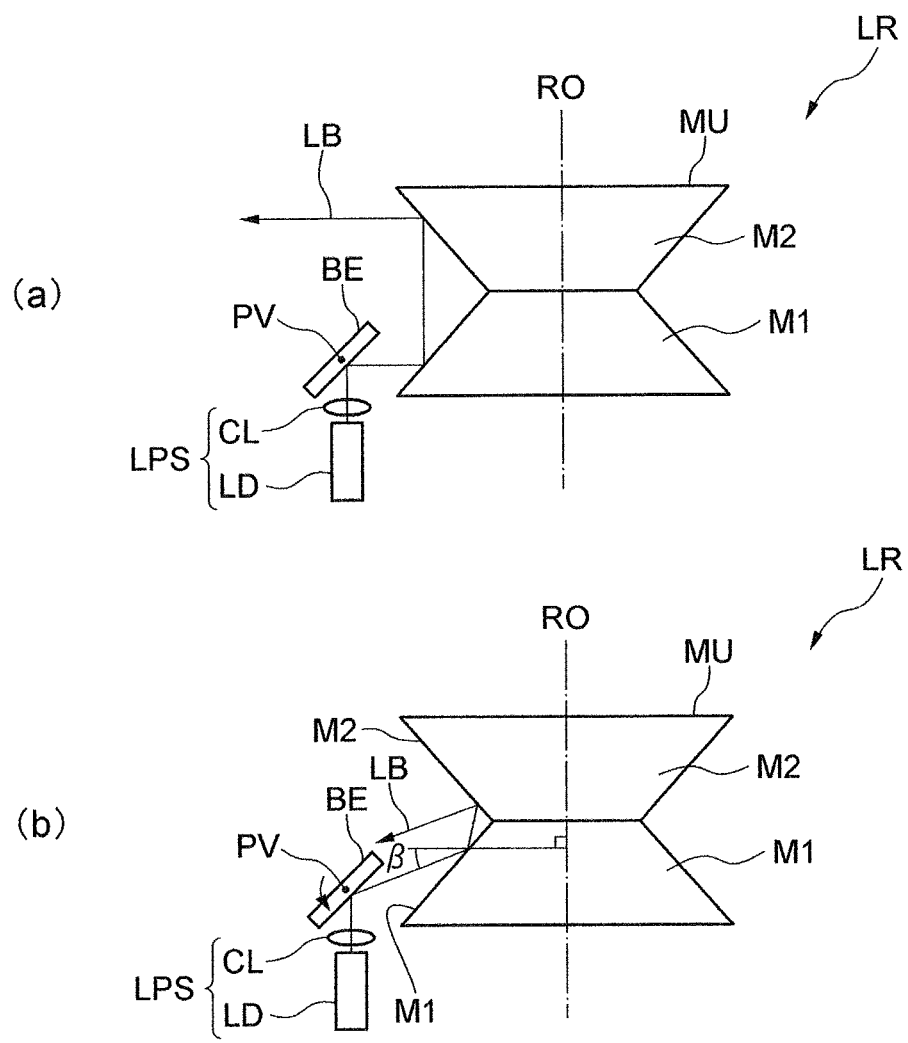
FIG. 15 is a cross sectional view showing a modification embodiment of the present embodiment.

FIG. 15 is a cross sectional view showing a modification embodiment of the present embodiment. In the modification embodiment shown in FIG. 15, all the respective intersection angles of a plurality of pairs of the first mirror surface M1 and the second mirror surface M2 in the mirror unit MU are constant (90 degrees). Moreover, a light flux LB from the light projecting system LPS is reflected with a reflecting mirror BE used as an example of a deflecting element, reflected on the first mirror surface M1, and then, reflected on the second mirror surface M2. The reflecting mirror BE is made rotatable around an axis line PV extending in a direction vertical to a sheet surface.

As is clear from a comparison between FIGS. 15(a) and 15(b), in the case where the reflecting mirror BE as a deflecting element is rotated around the axis line PV for each time when each pair of the first mirror surface M1 and the second mirror surface M2 passes, an incident angle • of the light flux LB reflected from the reflecting mirror BE to the first mirror surface M1 changes (in FIG. 15(a), •=0). Namely, in the case where the reflecting mirror BE is made to rotate around the axis line PV for each time when each pair of the first mirror surface M1 and the second mirror surface M2 passes, the direction of the light flux LB reflected from the first mirror surface M1 changes, and further, the direction of the light flux LB reflected from the second mirror surface M2 changes in the sub-scanning angle direction. Accordingly, similarly to the above-mentioned embodiment, there is an effect capable of performing scanning in the sub-scanning direction. Herein, the deflecting element should not be limited to the reflecting mirror, and an acousto-optical device or a MEMS mirror may be used as the deflecting element.

Figure 16:
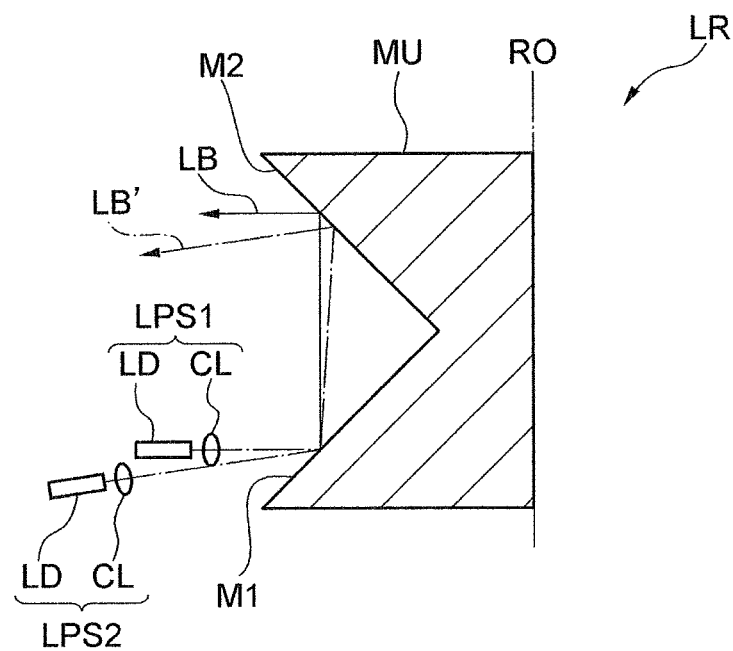
FIG. 16 is a cross sectional view showing another modification embodiment of the present embodiment.

FIG. 16 is a cross sectional view showing another modification embodiment of the present embodiment. In the modification embodiment shown in FIG. 16, two light projecting systems LPS1 and LPS2 are disposed so as to have respective different incident angles in the sub-scanning angle direction. Other than that, the modification embodiment is the same as that of the embodiment mentioned above. As shown in FIG. 16, in the case where light fluxes LB and LB' from the respective light projecting systems LPS1 and LPS2 are made to enter with the respective different incident angles to the first mirror surface M1, the respective emission directions of the light fluxes LB and LB' emitted from the second mirror surface M2 change in the sub-scanning angle direction. With this, it becomes possible to increase the number of scanning lines. Furthermore, by doing so, a range to perform the sub-scanning can be increased while using near an intersection angle of 90 degrees between the first mirror surface M1 and the second mirror surface M2.

Moreover, in the case where a plurality of light projecting systems are disposed at the position distant from the rotation axis RO (it is preferable that the incident angle is equal), the influence of the ridgeline (an intersecting portion with a mirror surface adjoining in the rotation direction) of the mirror unit becomes small. Accordingly, even if the number of pairs of the first mirror surface M1 and the second mirror surface M2 is increased, it becomes possible to widen the main scanning angle. Furthermore, it is possible to use the above-mentioned embodiment and the modification embodiment in combination.

Figure 17:
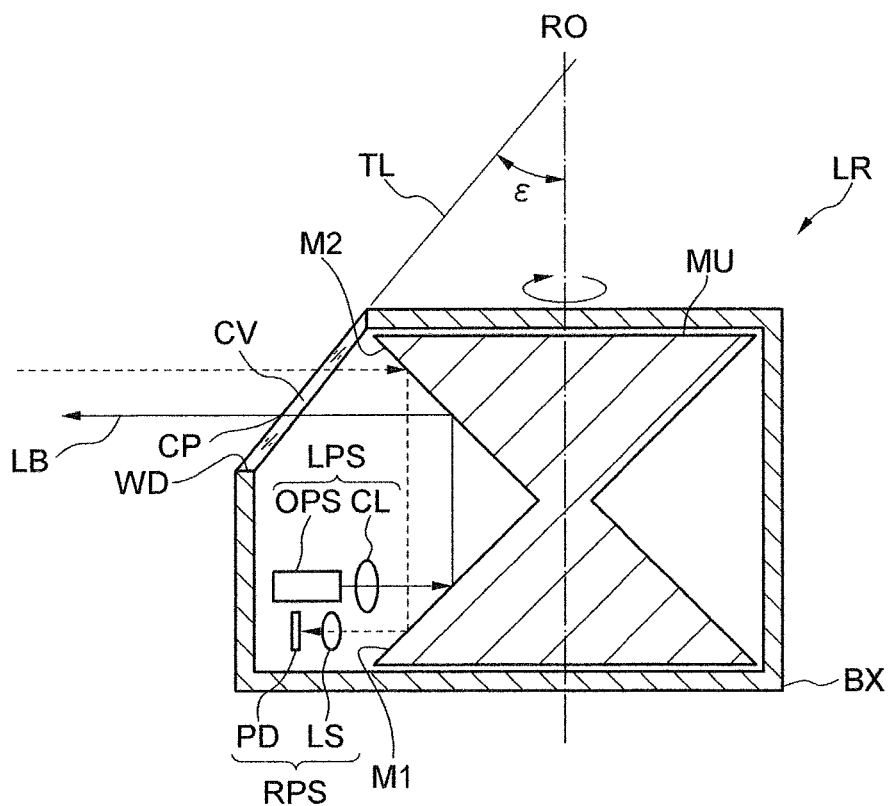
FIG. 17 is a cross sectional view showing another modification embodiment of the present embodiment.

FIG. 17 is a cross sectional view showing another modification embodiment of the present embodiment. In the modification embodiment shown in FIG. 17, a mirror unit MU, a light projecting system LPS, and a light receiving system RPS are disposed in a cylindrical box BX. The box BX includes a window portion WD opposed to the second reflective surface M2, and a conical transparent dustproof cover CV is pasted on this window part WD.

On a cross section (a cross section of FIG. 17) which includes the center of a laser light flux LB emitted so as to pass through the dustproof cover CV disposed so as to cover the second mirror surface M2 and the rotation axis RO of the mirror unit MU, a tangential line TL on an intersection point CP between the dustproof cover CV and the center of the emitted light flux LB intersects at an angle • with the rotation axis RO of the mirror unit MU, and satisfies the following formula. Accordingly, it is possible to avoid unnecessary reflection while exerting dustproof effect.

$$10\text{ degrees} < \bullet < 70\text{ degrees} \tag{1}$$

In the embodiment described above, the description is given on the assumption that the rotation axis RO of mirror unit MU is the approximately vertical direction. However, the present invention should not necessarily be limited to this constitution. For example, the rotation axis RO of mirror unit MU may be made to be oriented in an approximately horizontal direction. Such a laser radar can be used, for example, to detect a state and obstacles on the ground by being mounted on an unmanned helicopter and so on.

In the case where a laser radar is mounted on the unmanned helicopter and made to fly, and in the case where, for example, an obstacle, such as a vinyl house, is installed on the ground, laser light fluxes projected from the laser radar may enter an inclined side surface of the vinyl house. At this time, in the case where a laser light flux having entered the side surface of the vinyl house has a polarization direction vertical to the main scanning direction, similarly to the above case described in the example where a laser light flux enters a pond or a marsh, an amount of light reflected regularly on the side surface of the vinyl house becomes small, and an amount of light having passed in the vinyl house becomes larger. Accordingly the intensity of scattered light rays from an object in the vinyl house becomes strong. Therefore, the effect of the present invention can be exerted.

According to one aspect of the present invention, during one rotation of a mirror unit, a plurality of different positions parallel to the main scanning direction on an object side are scanned. Accordingly, it becomes possible to provide a scanning optical system used for a radar capable of projecting light fluxes on a wide range not only in the main scanning direction but also in the sub-scanning direction.

According to one aspect of the present invention, a mirror unit includes a plurality of pairs of the first mirror surface and the second mirror surface, and the intersection angle between the first mirror surface and the second mirror surface in each pair is different from those in the other pairs. Accordingly, a mirror surface is constituted to have a plane angle different from that of the adjoining mirror surface, whereby a laser light flux can be emitted toward a wide range not only in the main scanning direction but also in the sub-scanning direction.

According to one aspect of the present invention, a mirror unit includes a plurality of pairs of the first mirror surface and the second mirror surface, and the plurality of pairs include at least two pairs which have the same intersection angle between the first mirror surface and the second mirror surface and at least one pair which has an intersection angle different from that in at least the two pairs. With this, a frame rate etc. can be improved. For example, in the case of using in a vehicle, an environment between a self-vehicle and other vehicles changes quickly. Accordingly, a frame rate becomes more important than a viewing angle. For example, consideration is given to a case where the number of pairs of the first mirror surface and the second mirror surface is four. In the case where these pairs are constituted such that the first pair and the third pair (opposite surfaces) are provide with the same first intersection angle and the second pair and the fourth pair (opposite surfaces) are provide with the same second intersection angle (different from the first intersection angle), a viewing field in the rotation axis direction can be secured, and in addition, a frame rate also can be partially improved. Moreover, consideration is given to a case where the number of pairs of the first mirror surface and the second mirror surface is three. In the case where these pairs are constituted such that the first pair and the second pair are provide with the same first intersection angle and the third pair is provided with a second intersection angle different from the first constituting angle, this constitution is suitable to detect white lines and a center line on a road surface for which a frame rate is not required so much.

According to one aspect of the present invention, a deflecting element to change a proceeding direction of a light flux emitted from a light source is disposed between the light source and the mirror unit. Accordingly, even in the case where the intersection angle of each pair of the first mirror surface and the second mirror surface is set to constant, a laser light flux can be emitted to a wide range not only in the main scanning direction but also in the sub-scanning direction.

According to one aspect of the present invention, there are provided a plurality of light sources, and light fluxes emitted from the plurality of light sources have respective different incident angles to the first mirror surface on a cross section passing the rotation axis of the mirror unit. Accordingly, even in the case where the intersection angle of each pair of the first mirror surface and the second mirror surface is set to constant, a laser light flux can be emitted to a wide range not only in the main scanning direction but also in the sub-scanning direction.

According to one aspect of the present invention, a light flux emitted from the second mirror surface toward an object has a cross sectional shape orthogonal to the proceeding direction which is longer in the sub-scanning direction that in the main scanning direction. Accordingly, a wide range in the sub-scanning direction can be covered with the small number of scanning times.

According to one aspect of the present invention, there is provided a dustproof cover disposed so as to cover at least the second mirror surface and capable of transmitting a light flux emitted from the second mirror surface, and on a cross section including the rotation axis of the mirror unit and the center of a light flux emitted from the second mirror surface so as to pass the dustproof cover, a tangential line TL passing on an intersection point between the dustproof cover and the center of the emitted light flux intersects at an angle • with the rotation axis of the mirror unit, and satisfies the following formula.

$$10 \text{ degrees} < \bullet < 70 \text{ degrees} \tag{1}$$

In the case where there is provided a dustproof cover disposed so as to cover at least the second mirror surface, a dustproof effect for the second mirror surface can be exerted, and it is possible to prevent foreign matters from colliding to the mirror unit which rotates at high speed. Furthermore, since an angle • is made to lower than the upper limit of the formula (1), it is possible to reduce a fear that the mirror unit interferes with the dustproof cover. Also, since an angle • is made to higher than the lower limit of the formula (1), it is possible to suppress an inconvenience that a laser light flux which is reflected on the front and back surfaces of the dustproof cover without being projected to the outside, enters a light receiving element and causes ghost light rays.

It is clear for a person skilled in the art from the embodiments written in this specification and a technical concept that the present invention should not be limited to the embodiments written in this specification, and includes other embodiments and modification embodiments. The descriptions and the embodiments of this specification are aimed to show exemplification only, and the scope of the present invention is shown with claims mentioned later. For example, the contents of the present invention described with the drawings can be applied to all the embodiments. For example, a light source should not be limited to laser. For example, a light source using LED may be employed.

REFERENCE SIGNS LIST

BE Reflective mirror
BX Box
CL Collimator lens
CP Intersection point

CV Dustproof cover
FH Object in the water surface
GD Ground surface
INP Incident plane
IP Incident point
LB Laser light flux
LD Semiconductor laser
LPS1, LPS2 Light projecting system
LR Laser radar
LS Lens
M1 First mirror surface
M2 Second mirror surface
MU Mirror unit
OBJ Object
PD Photo diode
PND Pond or marsh
PV Axis line
RO Rotation axis
RPS Light receiving system
SL Spot light
SO Optical axis
SR Object range
TL Tangential line
WD Window portion
WS Water surface

The invention claimed is:

1. A scanning optical system, comprising:
   a mirror unit equipped with a first mirror surface and a second mirror surface each of which inclines to a rotation axis; and
   a light projecting system including at least one light source to emit a light flux toward the first mirror surface,
   wherein a light flux emitted from the light source is reflected on the first mirror surface of the mirror unit, thereafter, reflected on the second mirror surface, and then, projected so as to scan in a main scanning direction onto an object in accordance with rotation of the mirror unit, and
   wherein the light flux reflected on the second mirror surface is polarized in a range within an angle of ±30 degrees to a direction perpendicular to the main scanning direction on the object side.

2. The scanning optical system described in claim 1, wherein the mirror unit scans a plurality of different positions parallel to the main scanning direction on the object side during one rotation.

3. The scanning optical system described in claim 1, wherein the mirror unit includes a plurality of pairs of the first mirror surface and the second mirror surface, and an intersection angle between the first mirror surface and the second mirror surface in each pair is different from respective intersection angles of the other pairs.

4. The scanning optical system described in claim 1, wherein the mirror unit includes a plurality of pairs of the first mirror surface and the second mirror surface, and the plurality of pairs includes at least two pairs which have the same intersection angle between the first mirror surface and the second mirror surface and at least one pair which has an intersection angle different from the intersection angle of the two pairs.

5. The scanning optical system described in claim 1, further comprising:
   a deflecting element which is disposed between the light source and the mirror unit and changes a proceeding direction of a light flux emitted from the light source.

6. The scanning optical system described in claim 1, wherein the light source includes a plurality of light sources, and respective light fluxes emitted from the light sources have different incident angles to the first mirror surface on a cross section passing through the rotation axis.

7. The scanning optical system described in claim 1, wherein a light flux emitted from the second mirror surface toward the object has a cross sectional shape which is perpendicular to the proceeding direction and is shaped longer in a sub-scanning direction than in a main scanning direction.

8. The scanning optical system described in claim 1, further comprising:
   a dustproof cover which is disposed so as to cover at least the second mirror surface and is able to transmit a light flux emitted from the second mirror surface,
   wherein on a cross section which includes the rotation axis of the mirror unit and the center of a light flux emitted from the second mirror surface so as to pass through the dustproof cover, a tangential line passing on an intersection point between the dustproof cover and the center of the emitted light flux intersects at an angle ε with the rotation axis of the mirror unit, and satisfies the following formula $$10 \text{ degrees} < \varepsilon < 70 \text{ degrees} \qquad (1).$$

9. A radar, comprising:
   the scanning optical system described in claim 1, and
   a light receiving system to receive reflected light rays of a light flux emitted from the scanning optical system.

* * * * *